Oct. 25, 1966 — SHIGERU NARUTANI — 3,281,152

RECORD PLAYER

Filed May 21, 1963

INVENTOR.

Shigeru Narutani

BY

Hill, Sherman, Meroni, Gross & Simpson

ATTORNEYS

United States Patent Office 3,281,152
Patented Oct. 25, 1966

3,281,152

RECORD PLAYER

Shigeru Narutani, Suginami-ku, Tokyo, Japan, assignor to Nippon Columbia Kabushiki Kaisha (Nippon Columbia Co., Ltd.), Kawasaki, Japan, a corporation of Japan Filed May 21, 1963, Ser. No. 281,987
Claims priority, application Japan, May 25, 1962, 37/20,867
1 Claim. (Cl. 274—9)

This invention relates to a portable record player which is small and handy to carry, and more particularly to a portable record player in which a pickup arm is provided under a record and a stylus makes contact with the underside of the record.

In a usual record player, a turntable is mounted on a motor board and its driving device is placed thereunder. A cartridge is usually mounted on the top end of a pickup arm having its fulcrum and rotary shaft at one side away from the turntable mounted on the motor board, and by taking down the stylus of the cartridge on the record placed on the turntable with hand from above or effecting the same operation with an automatic player, the record can be played. However, this structure is not always requisite but a mere operational practice, and it is rather desirable that nothing is exposed on the turntable except the turntable. It is especially so for a child who is unfamiliar with working a record player or in a small-sized record player to be used outdoors and on vehicles.

Accordingly, one object of this invention is to provide a record player in which a pickup arm is arranged under a record and a stylus is made to contact the back of the record from underneath to play the record.

Another object of this invention is to provide a record player in which a turntable placed on a motor board is made to be covered by a lid, a window is provided on the motor board and the top end of the pickup arm is projected upwards through the window to bring a stylus into contact with a record from underneath.

Another object of this invention is to provide a record player in which when a lid is taken off a window is shut by a shutter, being interlocked with the lid.

Other objects, features and advantages of this invention will become apparent from the following description taken in connection with the accompanying drawings, in which.

Figure 1:
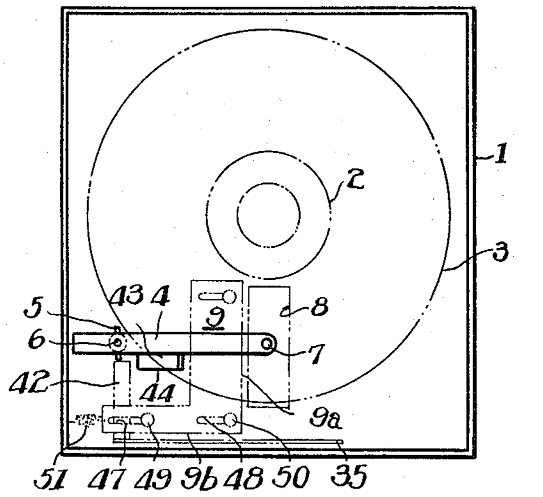
FIGURE 1 is a plan view showing an example of a mechanism of this invention.

Referring to the drawings, A is a casing, 1 a motor board, 2 a turntable of smaller diameter than the inner groove diameter of a record, 3 a record, 4 a pickup arm provided with a horizontal rotary shaft 5 and a vertical rotary shaft 6, and 7 a stylus mounted on the top of the pickup arm 4. On the motor board 1, there is provided a window 8 large enough for the stylus 7 of the pickup to move all over the sound groove band width without touching surroundings when playing the record. Between the motor board and the pickup arm 4 is interposed a shutter 9 which opens and shuts the window 8 in association with an upper lid 10 and the pickup arm 4 as will hereinafter be explained.

Now, an internal interlocking mechanism will be described. The pickup arm 4 is journalled at the horizontal shaft 5 and the vertical shaft 6 in the manner of a universal joint, and a spring 30 is secured at the back end of the pickup arm 4 so as to lift the top end portion thereof. 31 is a stopper. The lid 10 is pivoted at the right-hand marginal edge 32, on the inner wall of which an arm 33 is pivoted at 34, the free end thereof extending downwards through a slit at one side of the turntable and pivoted to a controlling lever 35 at 36. The controlling lever 35 is above the pickup arm 4, into the longitudinal grooves 37 and 38 of which are respectively fitted pins 39 and 40 planted on a fixed part, and this lever is always pulled to the left. On the side of the controlling lever 35 is provided a projection 42, which extends towards the pickup arm 4 and engages with a slanting portion 43 of a projection 44 of the pickup arm 4.

On the upper portion of the controlling lever 35 is provided a lug 45, which is so constructed as to engage with a lug 46 of the shutter 9. The shutter 9 is composed of a portion **9*a* for shutting the window 8 and a portion 9*b* parallel to the controlling lever 35. On the portion 9*b* are provided grooves 47 and 48, into which are respectively fitted pins 49 and 50 planted on a fixed part, thereby moving the shutter 9 in parallel to the controlling lever 35. 51** is a spring working in the direction in which the shutter is opened.

Figure 3:
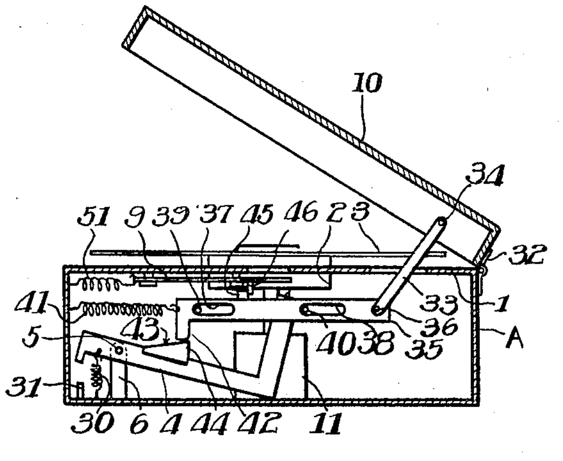
FIGURE 3 is a cross-sectional view showing parts of an interlocking mechanism when a lid is taken off.

When the lid 10 is lifted, the controlling lever 35 stays at the right-hand position and its lug 45 pulls the shutter 9 to the right to shut the window 9 as shown in FIGURE 3. At the same time, the projection 42 abuts against the slanting portion 43 of the projection 44 of the pickup arm, drawing in the top end of the pickup arm.

Figure 2:
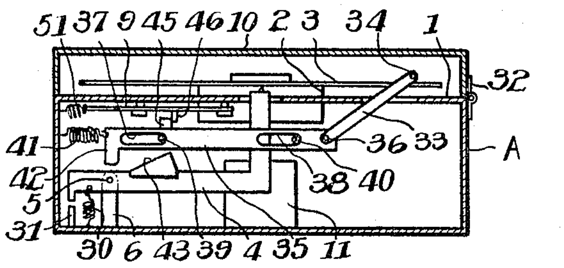
FIGURE 2 is a cross-sectional view illustrating in detail inner mechanisms with a case in cross-section.

When shutting down the lid 10 after the record 3 has been placed on the turntable 2 to play the record, the controlling lever 35 moves to the left due to the force of the spring 41, releasing the pickup arm. At this time, the pickup arm 4 becomes as shown in FIGURE 2 owing to the force of the spring 30. Simultaneously the shutter 9 is released and moves to the left to open the window 8. After being released, the pickup arm 4 brings the stylus 7 on the top end into contact with the back of the record 3 through the window 8. A switch may of course be provided which connects a power source to a turntable driving motor 11 and an amplifier at the same time as the stylus gets into contact with the record. Furthermore, with an arrangement of a mechanism that when the upper lid 10 is taken off the pickup arm 4 begins to go down and the top end of the pickup arm returns to its initial position on the record groove, a record may be played automatically with the opening and shutting of the upper lid. Since the stylus 7 is not exposed, a record may be played safely in any condition or even by a child.

As the interlocking mechanism required in this invention, any means which are used in conventional automatic players may be employed. In the practical manufacture, favorable results could be obtained by using cams and levers.

It must be noted that the pickup arm contacts the record from underneath and hence the record rotates counterclockwise. Since the turntable is smaller than the inner diameter of the record, a device for holding the record on the turntable, for example a fixture is provided at its center or an idler is mounted on the upper lid to press the record on to the turntable.

In accordance with use the upper lid is not always necessary and the pickup arm may well be interlocked with putting a record on the turntable and taking it off therefrom or a power source switch. With an arrangement of a small brush on the underside of the shutter, dust on the stylus of the pickup may be removed.

It will be apparent that many modifications and variations may be effected without departing from the scope of the novel concept of this invention.

What is claimed is:

A record player comprising a motor board having a window, a turntable placed thereon, a pickup arm arranged under the motor board, a shutter for said window, a lid, and an interlocking mechanism, said interlocking mechanism including an arm connected with said lid and a controlling lever connected with said arm for operating said shutter and said pickup arm in accordance with opening and closing of said lid, the top end of said pickup arm projecting through said window when said lid is closed to open said window, thereby bringing a stylus into contact with the back of a record placed on said turntable.

References Cited by the Examiner

UNITED STATES PATENTS 3,027,164 3/1962 Hasselbach et al. -- 274—23 X

NORTON ANSHER, *Primary Examiner.*

J. F. PETERS, Jr., *Assistant Examiner.*